(12) United States Patent
Kim et al.

(10) Patent No.: US 11,761,834 B2
(45) Date of Patent: Sep. 19, 2023

(54) DYNAMOMETER WITH OUTPUT CONTROL MECHANISM

(71) Applicant: DOOSAN ENERBILITY CO., LTD., Changwon (KR)

(72) Inventors: Yeong Chun Kim, Changwon (KR); Jin Uk Kim, Seoul (KR); Dong Hwa Jung, Changwon (KR); Gi Won Hong, Changwon (KR); Chang Goo Kim, Busan (KR); Young Ho Lee, Busan (KR)

(73) Assignee: DOOSAN ENERBILITY CO., LTD., Changwon (KR)

(*) Notice: Subject to any disclaimer, the term of this patent is extended or adjusted under 35 U.S.C. 154(b) by 0 days.

(21) Appl. No.: 17/844,093

(22) Filed: Jun. 20, 2022

(65) Prior Publication Data
US 2022/0404221 A1 Dec. 22, 2022

(30) Foreign Application Priority Data
Jun. 21, 2021 (KR) .................. 10-2021-0080213

(51) Int. Cl.
*G01L 3/04* (2006.01)
*G01M 15/02* (2006.01)
*G01M 15/14* (2006.01)

(52) U.S. Cl.
CPC .............. *G01L 3/04* (2013.01); *G01M 15/02* (2013.01); *G01M 15/14* (2013.01)

(58) Field of Classification Search
CPC ...... G01L 3/04; G01L 3/20; G01L 5/13; G01M 15/02; G01M 15/14
See application file for complete search history.

(56) References Cited

U.S. PATENT DOCUMENTS

| 2,428,005 | A | 2/1941 | Bennett | |
| 10,900,851 | B1* | 1/2021 | Warsaw | G01L 3/18 |
| 2009/0126510 | A1* | 5/2009 | Engstrom | G01L 3/20 |
| | | | | 73/862.14 |
| 2022/0381629 | A1* | 12/2022 | Kim | G01L 1/02 |
| 2022/0404221 | A1* | 12/2022 | Kim | G01L 3/04 |
| 2023/0057234 | A1* | 2/2023 | Huff | B64D 31/00 |

FOREIGN PATENT DOCUMENTS

CN 111896157 A 11/2020

* cited by examiner

*Primary Examiner* — Eric S. McCall
(74) *Attorney, Agent, or Firm* — Harvest IP Law, LLP

(57) ABSTRACT

Proposed is a dynamometer for measuring load of a rotary shaft to be tested, the dynamometer comprising: a dynamometer shaft connected to the rotary shaft to be tested; a casing part having a through hole through which the dynamometer shaft passes, and a water supply chamber and a drain chamber therein; a stator part including a first stator and a second stator to be spaced apart from each other; a toroidal chamber partitioning part partitioning a toroidal chamber into a first toroidal chamber and a second toroidal chamber, wherein the toroidal chamber partitioning part comprises a runner and a guide ring, forming a drain slot through which the fluid is discharged from the first toroidal chamber and the second toroidal chamber to the drain chamber; and a flow adjusting part adjusting flow rate of the fluid.

20 Claims, 13 Drawing Sheets

DYNAMOMETER WITH OUTPUT CONTROL MECHANISM

CROSS REFERENCE TO RELATED APPLICATION

The present application claims priority to Korean Patent Application No. 10-2021-0080213, filed on Jun. 21, 2021, the disclosure of which is incorporated by reference herein in its entirety.

BACKGROUND OF THE INVENTION

1. Field of the Invention

The present disclosure relates to a dynamometer and, more particularly, to a dynamometer for measuring load of a rotary shaft to be tested.

2. Description of the Background Art

Referring to the background art described in Korean Patent No. 10-1858132, a gas turbine is a rotary heat engine which activates a turbine with combustion gas of high temperature and high pressure. In order to generate combustion gas of high temperature and high pressure, a mixer of fuel/air sprayed from a combustion nozzle should be burned in a combustion chamber attached to a burner. While this combustion continues, the gas turbine continuously operates, and if supply of fuel and gas (in particular, supply of fuel) is suspended, the operation stops.

For a performance test of the gas turbine described above, a hydraulic dynamometer using water is used as a device for absorbing motive power of an engine and measuring the absorbed motive power. Several types of the hydraulic dynamometers are used depending upon output and operation speeds of the engine. Dynamometers for the gas turbine of large capacity and high power, etc. are roughly classified into a wear plate-type dynamometer called Kahn type and a flow-type dynamometer called Froude type.

The hydraulic dynamometer absorbs engine power transmitted to a dynamometer by hydraulic resistance between a rotator, a stator, and a housing. In the hydraulic dynamometers mainly used for the purpose of testing performance of large-sized high-speed gas turbines of 100 MW class or more and 3,000 rpm or more, control of cavitation and load fluctuation is a key matter. In particular, the flow-type hydraulic dynamometers require that excessive load fluctuation be solved. In the test process of the large-sized gas turbine of 270 MW class, problems that occur include damage to a blade of a runner provided in the flow-type hydraulic dynamometer, which is caused due to load instability and excessive fluctuation exceeding the load, making it impossible to perform the test.

SUMMARY OF THE INVENTION

The present disclosure provides a dynamometer in which a flow adjusting part is installed in a toroidal chamber to control the amount of fluid circulated through the toroidal chamber, thereby being capable of securing stability by suppressing the load instability phenomenon.

According to an aspect of the present disclosure, there is provided a dynamometer for measuring load of a rotary shaft to be tested. The dynamometer includes a dynamometer shaft, connected to the rotary shaft to be test, a casing part, a stator part, a toroidal chamber partitioning part, and flow adjusting parts. The casing part has a through hole through which the dynamometer shaft passes, the through hole being provided in a circumferential surface of the dynamometer shaft, and has a water supply chamber and a drain chamber therein. The stator part includes a first stator and a second stator provided in the casing part to be spaced apart from each other, both of which provide a space for forming a toroidal chamber on the circumferential surface of the dynamometer shaft. The stator part is formed with a supply nozzle through which fluid of the water supply chamber is supplied into the toroidal chamber. The toroidal chamber partitioning part is positioned between the first stator and the second stator and partitions the toroidal chamber into a first toroidal chamber and a second toroidal chamber, both of which are positioned to be spaced apart from each other. The toroidal chamber partitioning part includes a runner mounted on the circumferential surface of the dynamometer shaft, and a guide ring having one end fixed to the casing part and the other end protruding into the toroidal chamber. The runner is configured to rotate together upon rotation of the dynamometer shaft. The guide ring is configured to guide fluid in rotation in the first toroidal chamber and the second toroidal chamber to the drain chamber upon rotation of the runner, to form a drain slot in between the stator part, through which the fluid is discharged from the first toroidal chamber and the second toroidal chamber to the drain chamber. The flow adjusting parts, provided in the first toroidal chamber and the second toroidal chamber respectively, adjust flow rates of the fluid circulating in the first toroidal chamber and the second toroidal chamber.

According to another aspect of the present disclosure, there is provided a dynamometer for measuring load of a rotary shaft to be tested. The dynamometer includes a dynamometer shaft, connected to the rotary shaft to be test, a casing part, a stator part, a toroidal chamber partitioning part, and flow adjusting parts. The casing part has a through hole through which the dynamometer shaft passes, the through hole being provided in a circumferential surface of the dynamometer shaft, and has a water supply chamber and a drain chamber therein. The stator part includes a first stator and a second stator provided in the casing part to be spaced apart from each other, both of which provide a space for forming a toroidal chamber on the circumferential surface of the dynamometer shaft. The stator part is formed with a supply nozzle through which fluid of the water supply chamber is supplied into the toroidal chamber. The toroidal chamber partitioning part is positioned between the first stator and the second stator and partitions the toroidal chamber into a first toroidal chamber and a second toroidal chamber, both of which are positioned to be spaced apart from each other, and forming a drain slot in between the stator part, through which the fluid is discharged from the first toroidal chamber and the second toroidal chamber to the drain chamber. The toroidal chamber partitioning part is mounted on the circumferential surface of the dynamometer shaft, configured to rotate together upon rotation of the dynamometer shaft, thereby guiding the fluid in rotation in the first toroidal chamber and the second toroidal chamber to the drain slot. The flow adjusting parts, provided in the first toroidal chamber and the second toroidal chamber respectively, adjust flow rates of the fluid circulating in the first toroidal chamber and the second toroidal chamber.

According to a further aspect of the present disclosure, there is provided a dynamometer for measuring a load of a rotary shaft to be tested. The dynamometer includes a dynamometer shaft, connected to the rotary shaft to be test, a casing part, a stator part, a toroidal chamber partitioning part, and flow adjusting parts. The casing part has a through hole through which the dynamometer shaft passes, the through hole being provided in a circumferential surface of the dynamometer shaft, and has a water supply chamber and a drain chamber therein. The stator part includes a first stator and a second stator provided in the casing part to be spaced apart from each other, both of which provide a space for forming a toroidal chamber on the circumferential surface of the dynamometer shaft. The stator part is formed with a supply nozzle through which fluid of the water supply chamber is supplied into the toroidal chamber. The toroidal chamber partitioning part is positioned between the first stator and the second stator and partitions the toroidal chamber into a first toroidal chamber and a second toroidal chamber so as to be spaced apart from each other. The toroidal chamber partitioning part is mounted on the circumferential surface of the dynamometer shaft and guides the fluid in rotation in the first toroidal chamber and the second toroidal chamber to the drain slot while rotating jointly upon rotation of the dynamometer shaft. The flow adjusting parts, provided in the first toroidal chamber and the second toroidal chamber respectively, adjust flow rates of the fluid circulating in the first toroidal chamber and the second toroidal chamber.

The dynamometer according to an embodiment of the present disclosure installs flow adjusting parts in a first toroidal chamber and a second toroidal chamber respectively formed to be spaced apart from each other in a stator part so as to control the flow rate of a part of the fluid circulated through the first toroidal chamber and the second toroidal chamber and recirculated to a supply nozzle to which the fluid is supplied, thereby suppressing the load instability phenomenon and securing stability.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Hereinafter, exemplary embodiments according to the present disclosure will be described in detail with reference to the accompanying drawings. In the following description, for purpose of explanation, numerous specific details are set forth in order to provide a thorough understanding of one or more embodiments of the present invention. It may be noted that the illustrated embodiments and the terminology used herein are intended to explain, and not to limit the scope of the invention. The illustrated embodiments should be interpreted to include all modifications, equivalents, and alternatives of the embodiments included within the spirit and scope disclosed herein.

Referring to FIGS. 1 to 8, a first exemplary embodiment of the present disclosure provides a dynamometer 100 for measuring load of a rotary shaft to be tested. The dynamometer 100 includes a dynamometer shaft 1100, a casing part 1200, a stator part 1300, a toroidal chamber partitioning part 1400, and flow adjusting parts 1500.

Figure 1:
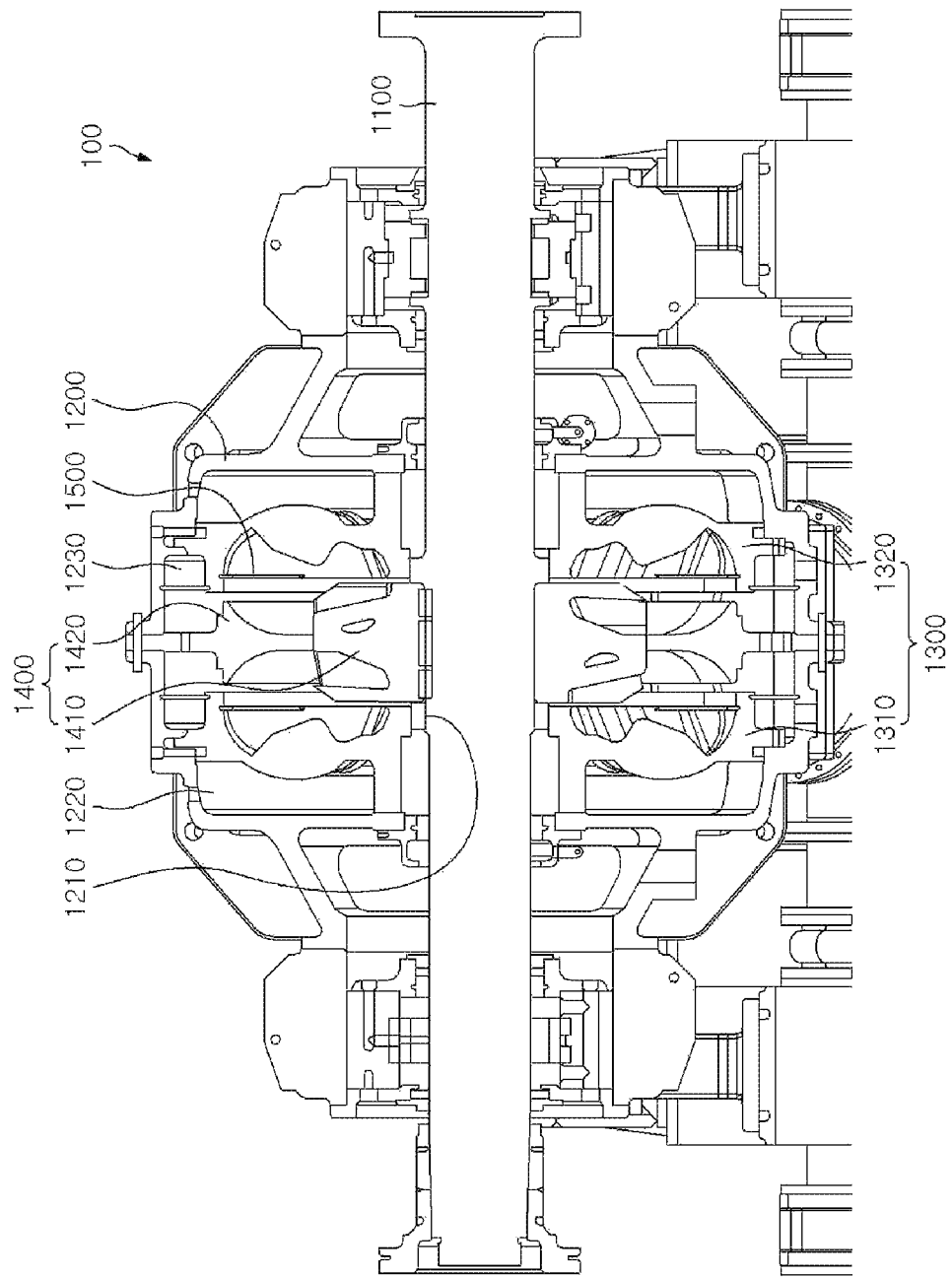
FIG. 1 is a view schematically illustrating a dynamometer according to a first exemplary embodiment of the present disclosure.
Figure 2:
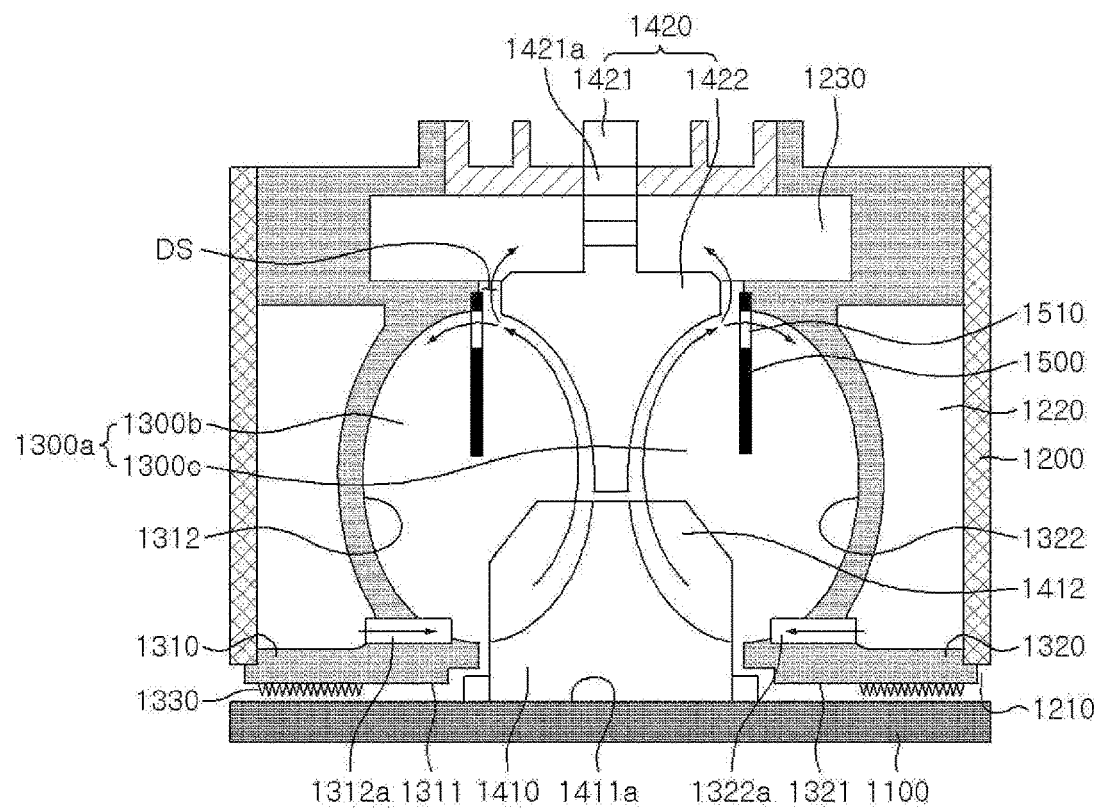
FIG. 2 is an enlarged view of an illustration where a stator part, a toroidal chamber partitioning part, and flow adjusting parts are installed inside a casing part shown in FIG. 1.
Figure 3:
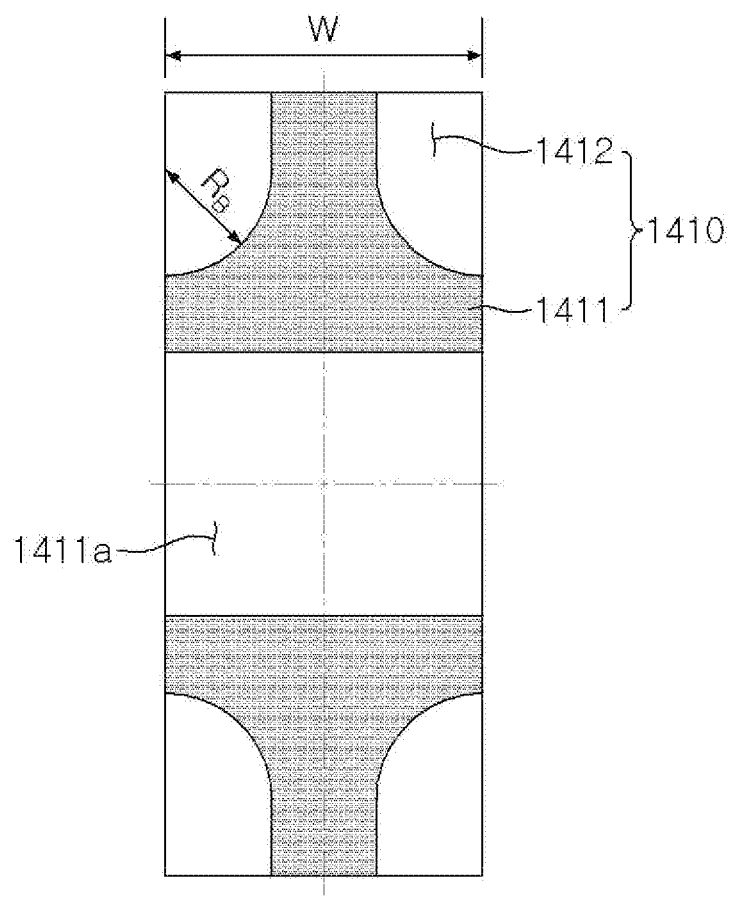
FIG. 3 is an enlarged cross-sectional view illustrating an runner of the toroidal chamber partitioning part shown in FIG. 2.

With reference to FIGS. 1 and 2, the dynamometer shaft 1100 may be connected by a coupling (not shown) to the rotary shaft to be tested (not shown) and may be rotated together upon rotation of the rotary shaft (not shown). The casing part 1200 is provided in a circumferential surface of the dynamometer shaft 1100. In the center of the casing part 1200, a through hole 1210 through which the dynamometer shaft 1100 passes is formed, and a water supply chamber 1220 and a drain chamber 1230 may be formed inside the casing part 1200.

Inside the casing part 1200, the stator part 1300 is formed, providing a space for forming a toroidal chamber 1300a in the circumferential surface of the dynamometer shaft 1100. In a space between the casing part 1200 and the stator part 1300, the water supply chamber 1220 storing therein fluid supplied into the toroidal chamber 1300a is formed.

Figure 4:
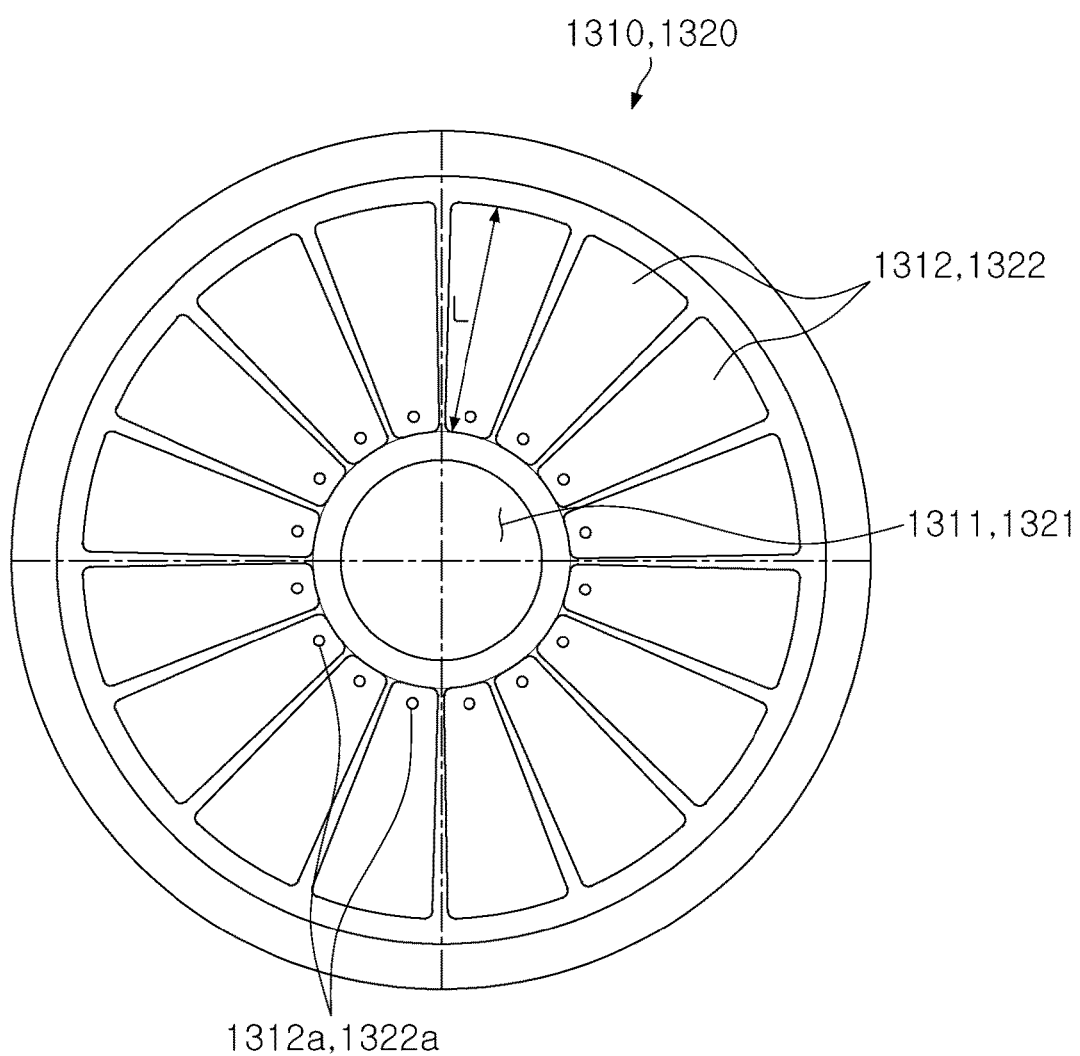
FIG. 4 is an enlarged side elevational view illustrating an first stator of the stator part shown in FIG. 2.
Figure 5:
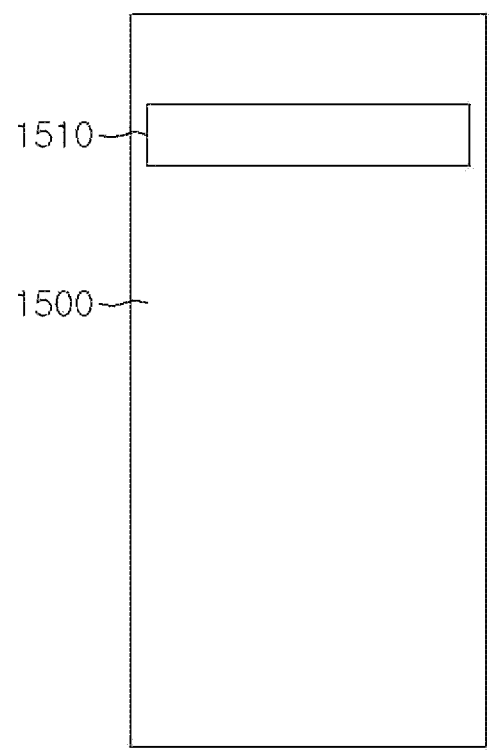
FIGS. 5 to 8 are views illustrating shapes of control slots formed in the flow adjusting parts shown in FIG. 2.
Figure 6:
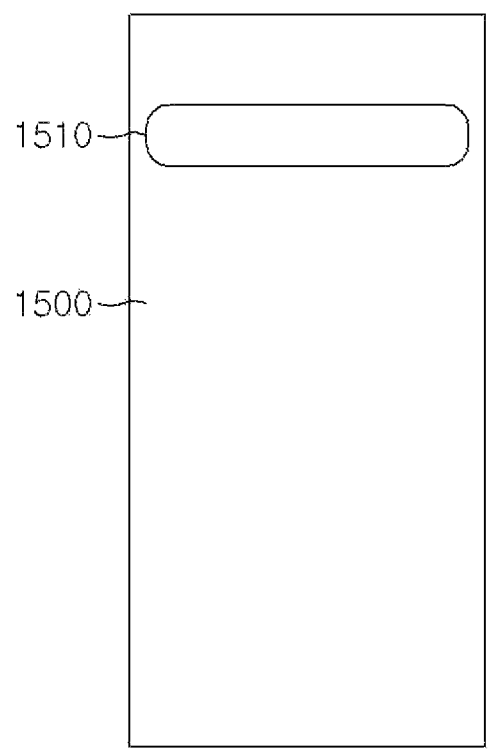
Figure 7:
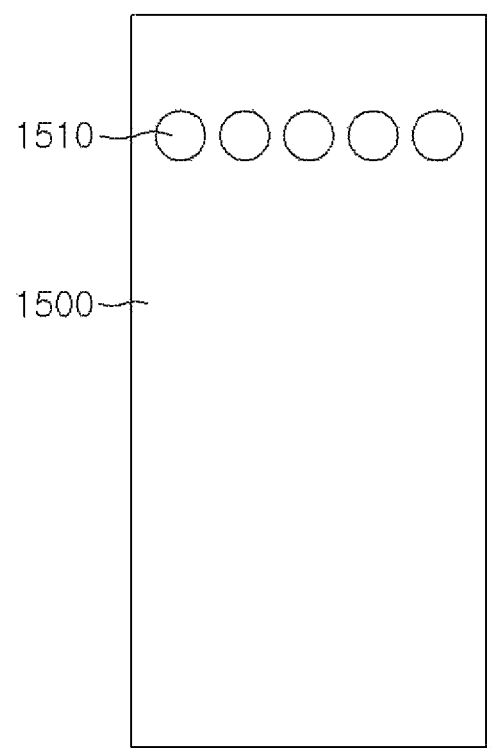
Figure 8:
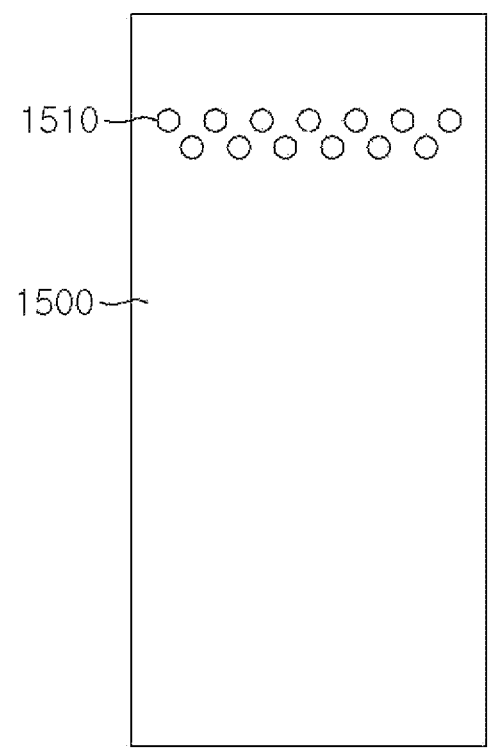

With reference to FIGS. 2 and 4, the stator part 1300 includes a first stator 1310 and a second stator 1320 spaced apart from the first stator 1310, and the toroidal chamber 1300a is formed between the first stator 1310 and the second stator 1320, both of which are spaced apart from each other. According to an embodiment, a first supply nozzle 1312a and a second supply nozzle 1322a, both of which supply fluid contained in the water supply chamber 1220 into the toroidal chamber 1300a, are formed in the first stator 1310 and the second stator 1320 respectively.

In the center of the first stator 1310, a first through hole 1311 through which the dynamometer shaft passes is formed. A plurality of pockets 1312 forming the toroidal chamber 1300a are formed in the first stator 1310. According to an embodiment, each of the plurality of first pockets 1312 may be trapezoidal in shape and curved to form a semicircular cross-section. According to another embodiment, in the first stator 1310, the plurality of first pockets 1312 may be spaced apart from each other in a rotational direction on the basis of the first through hole 1311, and the first supply nozzle 1312a supplying fluid into the toroidal chamber 1300a may be formed in each first pocket 1312 adjacently to the first through hole 1311.

In the first pocket 1312, a first air supply port (not shown) 1312b may be formed to be spaced apart from the first supply nozzle 1312a. External air may be injected into the toroidal chamber 1300a from the outside of the first stator 1310 through the first air supply port 1312b, and the first air supply port 1312b may communicate with an outer circumferential surface of the first stator 1310.

Inside the casing part 1200, the second stator 1320 is provided spaced apart from the first stator 1310. According to an embodiment, the second stator 1320 may corresponds in shape to the first stator 1310.

In the center of the second stator 1320, a second through hole 1321 through which the dynamometer shaft 1100 passes is formed, and a plurality of second pockets 1322 forming the toroidal chamber 1300a is formed in the second stator 1320. According to an embodiment, it is preferred that each of the plurality of second pockets 1322 may be trapezoidal in shape and curved to form a semicircular cross-section. According to another embodiment, in the second stator 1320, the plurality of second pockets 1322 may be formed to be spaced apart from each other in a rotational direction on the basis of the second through hole 1321, and the second supply nozzle 1322a supplying fluid into the toroidal chamber 1300a may be formed in each second pocket 1322 adjacently to the second through hole 1321.

In the second pocket 1322, a second air supply port (not shown) 1322b may be formed spaced apart from the second supply nozzle 1322a. External air may be injected into the toroidal chamber 1300a from the outside of the second stator 1320 through the second air supply port 1322b, and the second air supply port 1322b may communicate with an outer circumferential surface of the second stator 1320.

According to an embodiment, fluid sealing members 1330 may be provided in the first through hole 1311 of the first stator 1310 and the second through hole 1321 of the second stator 1320 respectively. As the fluid sealing members 1330 are provided on the circumferential surface of the dynamometer shaft 1100, and in the first through hole 1311 and the second through hole 1321, respectively, the fluid flowing into the toroidal chamber 1300a is prevented from leaking through a space between the circumferential surface of the dynamometer shaft 1100 and the first through hole 1311 and the second through hole 1321 is prevented.

Referring to FIGS. 2 to 5, the toroidal chamber partitioning part 1400 is positioned between the first stator 1310 and the second stator 1320 which are provided inside the casing part 1200 to be spaced apart from each other. By the toroidal chamber partitioning part 1400, the toroidal chamber 1300a is partitioned into the first toroidal chamber 1300b and the second toroidal chamber 1300c, both of which are spaced apart from each other.

The toroidal chamber partitioning part 1400 includes a runner 1410 and a guide ring 1420. The runner 1410 is mounted on the circumferential surface of the dynamometer shaft 1100 and is rotated jointly upon rotation of the dynamometer shaft 1100, thereby functioning to rotate the fluid flowing into the toroidal chamber 1300a.

According to an embodiment, an end of the guide ring 1420 is fixed to the casing part 1200 and the other end thereof protrudes into the toroidal chamber 1300a. The guide ring 1420 forms a drain slot DS which is formed between the first stator 1310 and the second stator 1320. As the fluid is rotated in the first toroidal chamber 1300b and the second toroidal chamber 1300c upon rotation of the runner 1410, the guide ring 1420 is configured to guide the fluid to the drain chamber 1230 and to discharge the fluid from the first toroidal chamber 1300b and the second toroidal chamber 1300c to the drain chamber 1230.

According to an embodiment, the runner 1410 includes a main body 1411 and a blade 1412. The main body 1411 may have a rectangular cross-section. In the center of the main body 1411, a mount hole 1411a is formed for the dynamometer shaft 1100 to pass therethrough. According to an embodiment, both lateral surfaces of the main body 1411 may be configured to be spaced apart from the mount hole 1411a and to be inserted into the mount hole 1411a from the outside to the inside curvedly in the outer circumference direction thereof. As both lateral surfaces of the main body 1411 have a shape curved in the outer circumference direction, the fluid in the first toroidal chamber 1300b and the second toroidal chamber 1300c may be rotated by the blade 1412 in the curved outer circumference direction upon rotation of the main body 1411.

According to an embodiment, the runner 1410 may have a width W about three times the width $R_B$ of the blade 1412. Considering stress and strength, it may be preferred to design the runner 1410 to have a width about three times the width of the blade 1412 when the blade 1412 is installed.

The blade 1412 is formed in plural to protrude on both lateral surfaces of the main body 1411 and functions to pressurize the main body 1411 so as to allow the fluid to be rotated upon rotation of the main body 1411. According to an embodiment, it is preferred that the blade 1412 is different in number from the number of the first pockets 1312 and the number of the second pockets 1322.

In order to avoid amplification of vibration due to interaction for forming a toroidal flow within the toroidal chamber 1300a, according to an embodiment, it is preferred that the numbers of the first pockets 1312 and the second pockets 1322 are one more than or one less than the number of the blades 1412 so that the numbers of the first pockets 1312 and the second pockets 1322 do not coincide with the number of the blades 1412. According to another embodiment, it is also preferred that the longitudinal lengths L of the first pockets 1312 and the second pockets 1322 are twice or three times the length of each of the blades 1412. When the longitudinal lengths L of the first pockets 1312 and the second pockets 1322 are too small, the toroidal flow may be better formed, but a problem may be caused that as the inner pressure is raised, water supply pressure of the fluid supplied to the supply nozzles 1312a and 1322a should be raised.

According to an embodiment, the guide ring 1420 having one end fixed to the casing part 1200 and the other end protruding in the toroidal chamber 1300a includes a mount portion 1421 and a protruding portion 1422. The mount portion 1421 may have one end mounted on the casing part 1200, and the protruding portion 1422 may be integrally formed with the mount portion 1421, thereby protruding into the toroidal chamber 1300a. According to an embodiment, it is preferred that the protruding portion 1422 corresponds in shape to the runner 1410. As an detailed example of an embodiment, the protruding portion 1422 may have a rectangular cross-section and both lateral surfaces thereof being spaced apart from the mount portion 1421 may have a shape curved in the inner circumference direction to be inserted from the outside to the inside. The mount portion 1421 may partition the drain chamber 1230 formed in the casing part 1200 when fixed to the casing part 1200. According to an embodiment, it is preferred that in the mount portion 1421, a communication hole 1421a is formed, so that the fluid in the drain chamber can flow and pass therethrough.

According to an embodiment, the flow adjusting parts 1500 may be provided in the first toroidal chamber 1300b and the second toroidal chamber 1300c respectively partitioned by the toroidal chamber partitioning part 1400, and the flow adjusting parts 1500 function to adjust flow rate of the fluid circulated in the first toroidal chamber 1300b and the second toroidal chamber 1300c.

According to an embodiment, the flow adjusting parts 1500 may be mounted on the first stator 1310 and the second stator 1320 respectively to be adjacent to the drain slot DS in the first toroidal chamber 1300b and the second toroidal chamber 1300c. In each of the flow adjusting parts 1500, a control slot 1510 may be formed, and the control slot 1510 may circulate a part of the fluid flowing to be rotated in the first toroidal chamber 1300b and the second toroidal chamber 1300c to the supply nozzles 1312a and 1322a.

According to an embodiment, it is preferred that the control slot 1510 formed in each of the flow adjusting parts 1500 is disposed adjacently to the drain slot DS formed in an outer circumferential side of the first toroidal chamber 1300b and the second toroidal chamber 1300c

According to an embodiment, mixture of an abnormal flow and a normal flow is generated upon circulation flow of the fluid in the first toroidal chamber 1300b and the second toroidal chamber 1300c. According to the operation mechanism of the circulation flow, the normal flow may occur in the outer portions of the first pockets 1312 and the second pockets 1322, and the abnormal flow may occur in the central portions of the first pockets 1312 and the second pockets 1322. According to an embodiment, the abnormal flow is guided to the drain chamber 1230 through each of the flow adjusting parts 1500, and the normal flow is circulated to the supply nozzles 1312a and 1322a through the control slot 1510, thereby controlling the recirculation flow.

Referring to FIGS. 5 to 8, the control slot 1510 may be in various shapes. For example, the control slot may be in a rectangular shape as in FIG. 5. According to an embodiment, the corners of the rectangular shape may be entirely or partially curved as in FIG. 6. According to another embodiment, the control slot 1510 may be in a the plurality of the control slots 1510 having a round shape or in a shape of hole as in FIG. 7. According to yet an embodiment, the plurality of the control slots 1510 may be spaced apart from each other in one tier or in multiple tiers. When the plurality of control slots 1510 are disposed in multiple tiers as in FIG. 8, according to an embodiment, it is preferred that they are arranged in a zigzag manner.

With reference to FIGS. 1 and 2, according to an embodiment a control part (not shown) may be provided in the casing part 1200. The control part (not shown) may function to measure the amount of fluid supplied to the toroidal chamber 1300a from the water supply chamber 1220 and the amount of fluid discharged to the drain chamber 1230 from the toroidal chamber, and thereafter compare the supplied amount and the discharged amount of the fluid. By comparing the supplied amount and the discharged amount of the fluid, it may be possible to check whether or not friction loss occurs.

Respectively in the first toroidal chamber 1300b and the second toroidal chamber 1300c which are formed to be spaced apart from each other in the stator part 1300, the flow adjusting parts 1500 are installed, thereby controlling flow rate of a part of the fluid circulated through the first toroidal chamber 1300b and the second toroidal chamber 1300c and recirculated to the supply nozzles 1312a and 1322a, which serves to secure stability by suppressing the load instability phenomenon.

Figure 9:
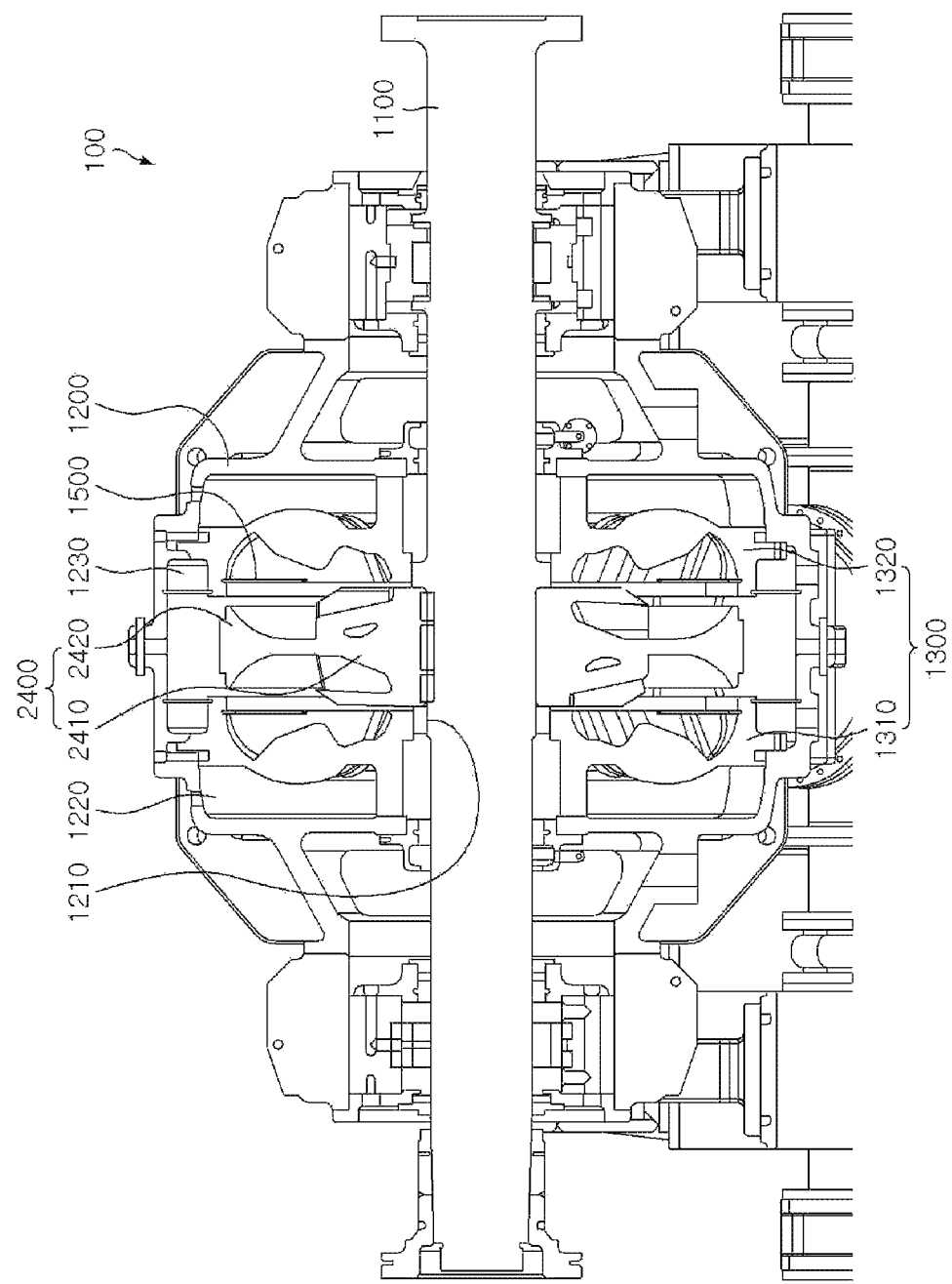
FIG. 9 is a view schematically illustrating a dynamometer according to a second exemplary embodiment of the present disclosure.
Figure 10:
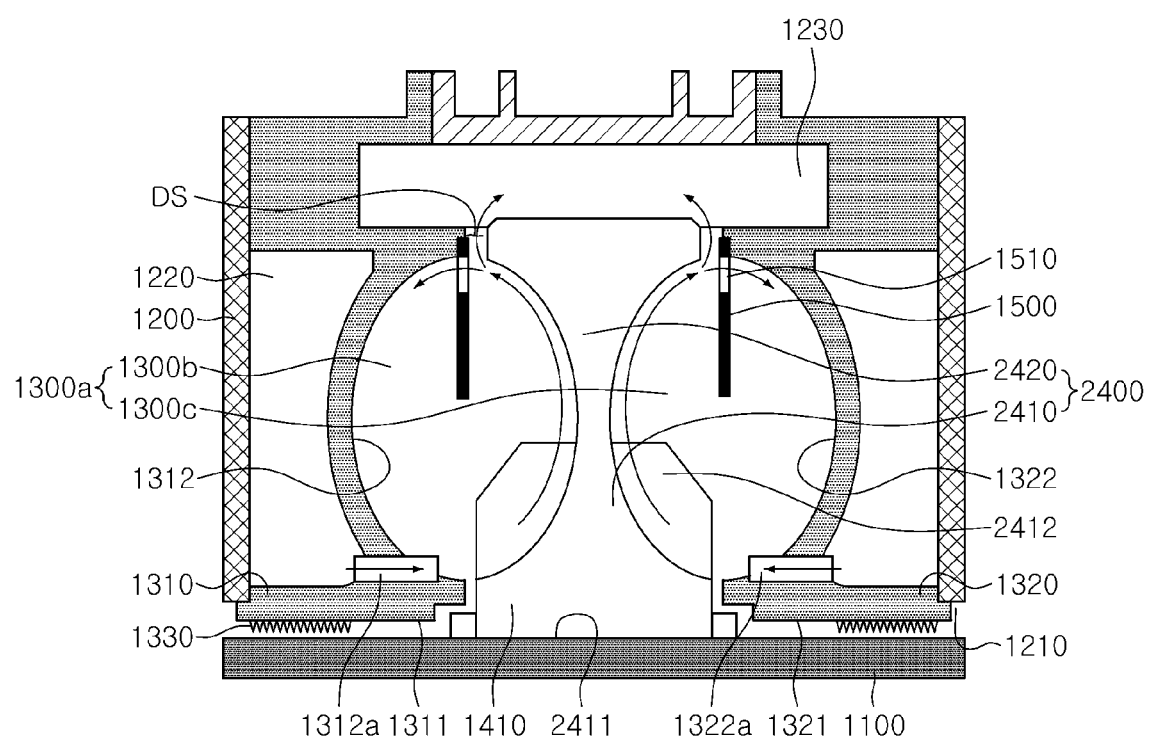
FIG. 10 is an enlarged view of an illustration where a stator part, a toroidal chamber partitioning part, and flow adjusting parts are installed inside a casing part of the dynamometer according to the second exemplary embodiment of the present disclosure.

With reference to FIGS. 9 and 10, the dynamometer 100 according to a second exemplary embodiment of the present disclosure includes a dynamometer shaft 1100, a casing part 1200, a stator part 1300, a toroidal chamber partitioning part 2400, and flow adjusting parts 1500.

The dynamometer shaft 1100, the casing part 1200, the stator part 1300, and the flow adjusting parts 1500 according to the second exemplary embodiment of the present disclosure may be similar to embodiments of the dynamometer shaft, the casing part, the stator part, and the flow adjusting parts according to the first exemplary embodiment of the present disclosure. Accordingly, repetitive detailed description of the dynamometer shaft, the casing part, the stator part, and the flow adjusting parts of the second exemplary embodiment will be omitted.

The toroidal chamber partitioning part 2400 is positioned between a first stator 1310 and a second stator 1320 of the stator part 1300 and partitions a toroidal chamber 1300a formed in the stator part 1300 into a first toroidal chamber 1300b and a second toroidal chamber 1300c. The toroidal chamber partitioning part 2400 may form a drain slot DS which discharges fluid to the drain chamber from the first toroidal chamber 1300b and the second toroidal chamber 1300c, in connection with the first stator 1310 and the second stator 1320. The toroidal chamber partitioning part 2400 may rotate together upon rotation of the dynamometer shaft 1100 and function to guide the fluid circulated in the first toroidal chamber 1300b and the second toroidal chamber 1300c to the drain slot DS.

According to an embodiment, the toroidal chamber partitioning part 2400 may include a mount portion 2410 and a guide portion 2420. In the center of the mount portion 2410, a mount hole 2411 for the circumferential surface of the dynamometer shaft 1100 is formed. On both lateral surfaces of the mount portion 2410, a plurality of blades 2412 are installed to protrude. According to an embodiment, it is preferred that the number of the blades 2412 is different from the number of the first pockets 1312 and the number of second pockets 1322 of the first stator 1310 and the second stator 1320 respectively.

According to an embodiment, on the outer side of the mount portion 2410, the guide portion 2420 may protrude. The guide portion 2420 may form the drain slot DS in the first toroidal chamber 1300b and the second toroidal chamber 1300c, in connection with the first stator 1310 and the second stator 1320. The guide portion 2420 may function to guide the fluid flowing to be circulated in the first toroidal chamber 1300b and the second toroidal chamber 1300c to the drain slot DS. According to an embodiment, it is preferred that both lateral surfaces of the mount portion 2410 and the guide portion 2420 are curved to form a semicircular cross-section to be inserted from the outside to the inside, and the first toroidal chamber 1300b and the second toroidal chamber 1300c are formed between both lateral surfaces of the mount portion 2410 and the guide portion 2420 and between the first pocket 1312 and the second pocket 1322.

Figure 11:
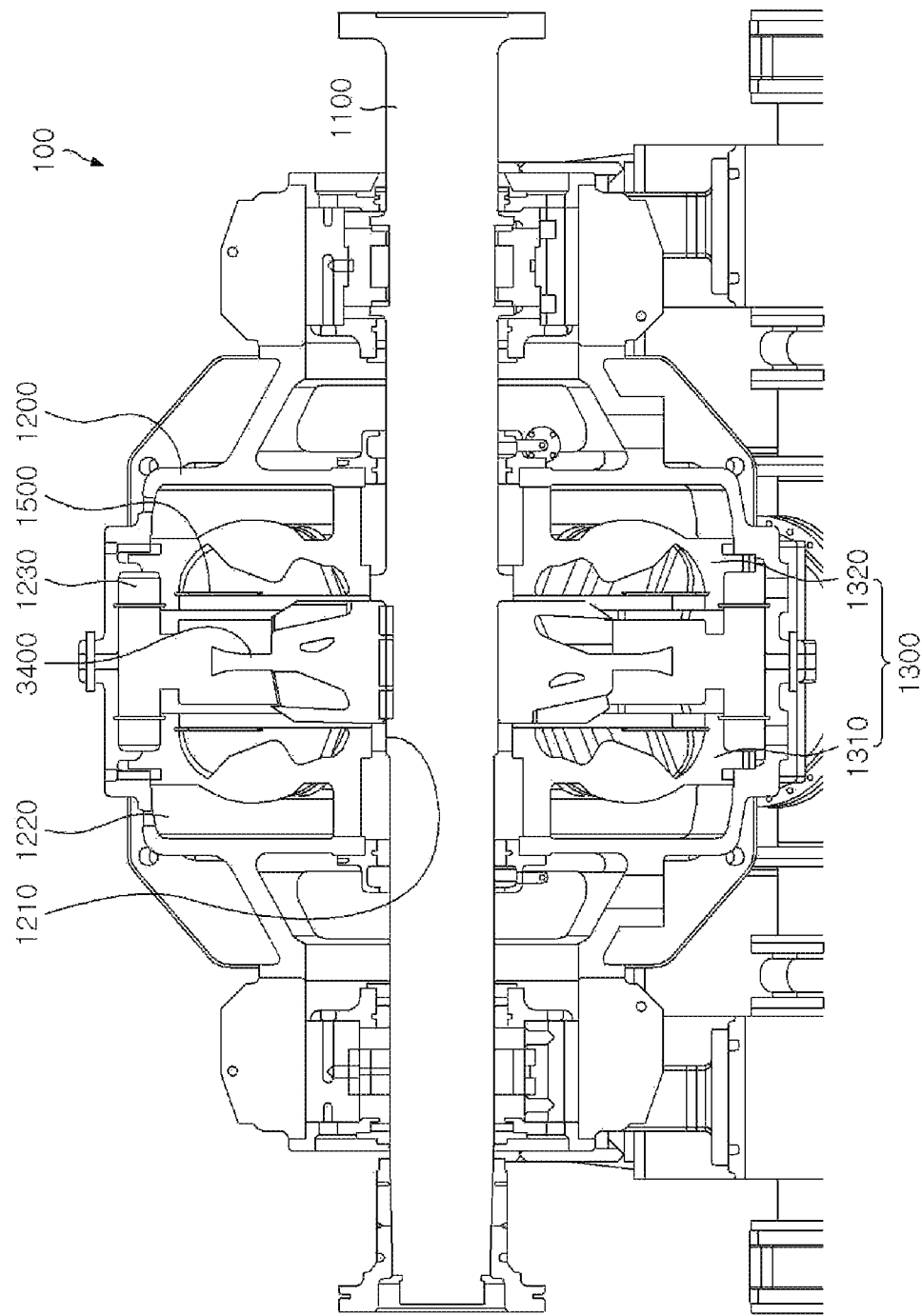
FIG. 11 is a view schematically illustrating a dynamometer according to a third exemplary embodiment of the present disclosure.
Figure 12:
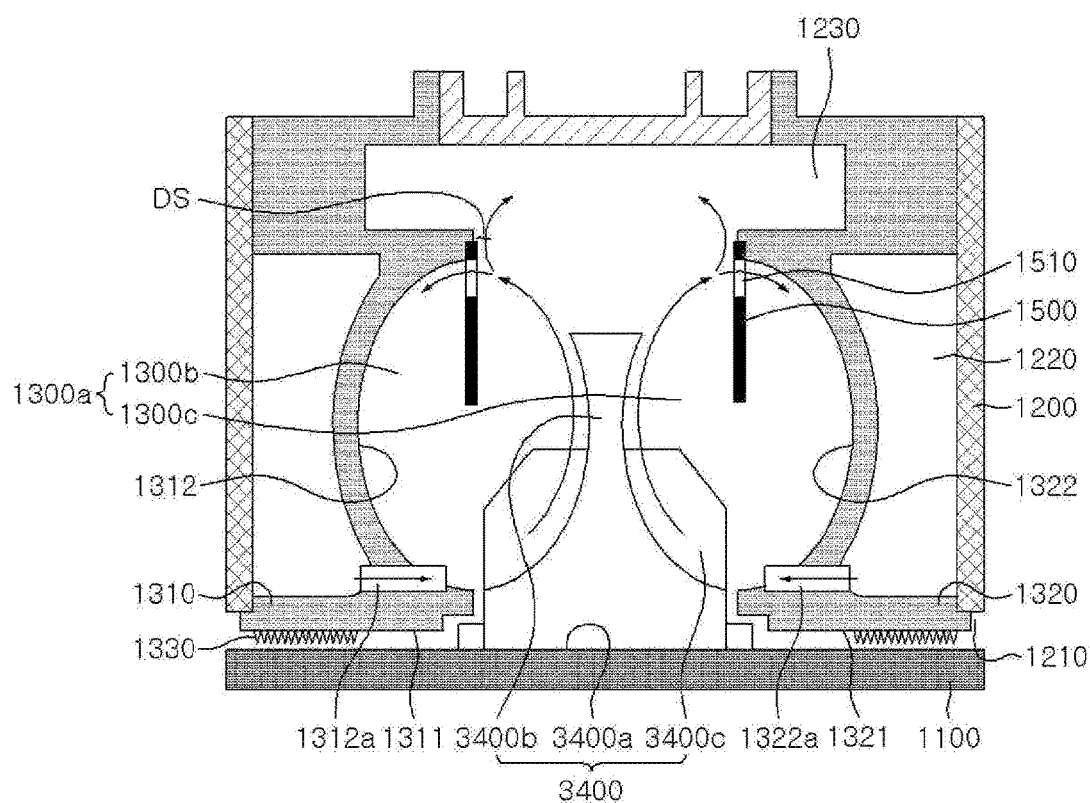
FIG. 12 is an enlarged view of an illustration where a stator part, a toroidal chamber partitioning part, and flow adjusting parts are installed inside a casing part of the dynamometer of the third exemplary embodiment of the present disclosure shown in FIG. 11.

With reference to FIGS. 11 and 12, the dynamometer 100 according to the third exemplary embodiment of the present disclosure includes a dynamometer shaft 1100, a casing part 1200, a stator part 1300, a toroidal chamber partitioning part 3400, and flow adjusting parts 1500.

The dynamometer shaft 1100, the casing part 1200, the stator part 1300, and the flow adjusting parts 1500 according to the third exemplary embodiment of the present disclosure may be similar to embodiments of the dynamometer shafts, the casing parts, the stator parts, and the flow adjusting parts according to the first and the second exemplary embodiments of the present disclosure. Accordingly, repetitive detailed description of the dynamometer shaft, the casing part, the stator part, and the flow adjusting parts will be omitted.

The toroidal chamber partitioning part 3400 is positioned between the first stator 1310 and the second stator 1320 of the stator part 1300 and partitions the toroidal chamber 1300*a* formed in the stator part 1300 into the first toroidal chamber 1300*b* and the second toroidal chamber 1300*c*. According an embodiment, the toroidal chamber partitioning part 3400 may be mounted on the circumferential surface of the dynamometer shaft 1100 and rotated together upon rotation of the dynamometer shaft 1100, functioning to guide the fluid rotated in the first toroidal chamber 1300*b* and the second toroidal chamber 1300*c* to the drain slot DS.

According to an embodiment, a main body of the toroidal chamber partitioning part 3400 has a rectangular cross-section. In the center of the main body, a mount hole 3400*a* is formed on the outer circumferential surface of the main body for the circumferential surface of the dynamometer shaft 1100 to pass through the rectangular cross-section. According to an embodiment, a protruding portion 3400*b* is formed on the outer circumferential surface of the main body, so that the protruding portion 3400*b* protrudes to be inclined curvedly from the outside to the inside. The protruding portion 3400*b* may function to guide the fluid flowing to be rotated in the first toroidal chamber 1300*b* and the second toroidal chamber 1300*c* to the drain chamber 1230.

On both lateral surfaces of the protruding portion 3400*b*, a plurality of blades 3400*c* are formed to protrude. According to an embodiment, it is preferred that the number of the blades 3400*c* is different from the number of the first pockets 1312 and the number of second pockets 1322 of the first stator 1310 and the second stator 1320 respectively.

According to an embodiment, it is preferred that a tip end of the protruding portion 3400*b* protrudes to be located on the outer circumferential surface on the basis of the center between the first toroidal chamber 1300*b* and the second toroidal chamber 1300*c*, to thereby be adjacent to the flow adjusting parts 1500 in the first toroidal chamber 1300*b* and the second toroidal chamber 1300*c* respectively. In addition, as the protruding portion 3400*b* has a lateral surface which is formed to be curved in a concave shape, the fluid circulated in the toroidal chamber 1300*a* may be guided to the flow adjusting part 1500.

The flow adjusting parts 1500 are installed in the first toroidal chamber 1300*b* and the second toroidal chamber 1300*c* respectively formed to be spaced apart from each other in the stator part 1300 according to the third exemplary embodiment of the present disclosure. According to an embodiment, the flow adjusting parts 1500 control flow rate of the fluid recirculated to the supply nozzles 1312*a* and 1322*a* to which a part of the fluid circulated through the first toroidal chamber 1300*b* and the second toroidal chamber 1300*c* is supplied, thereby serving to secure stability by suppressing the load instability phenomenon.

Figure 13:
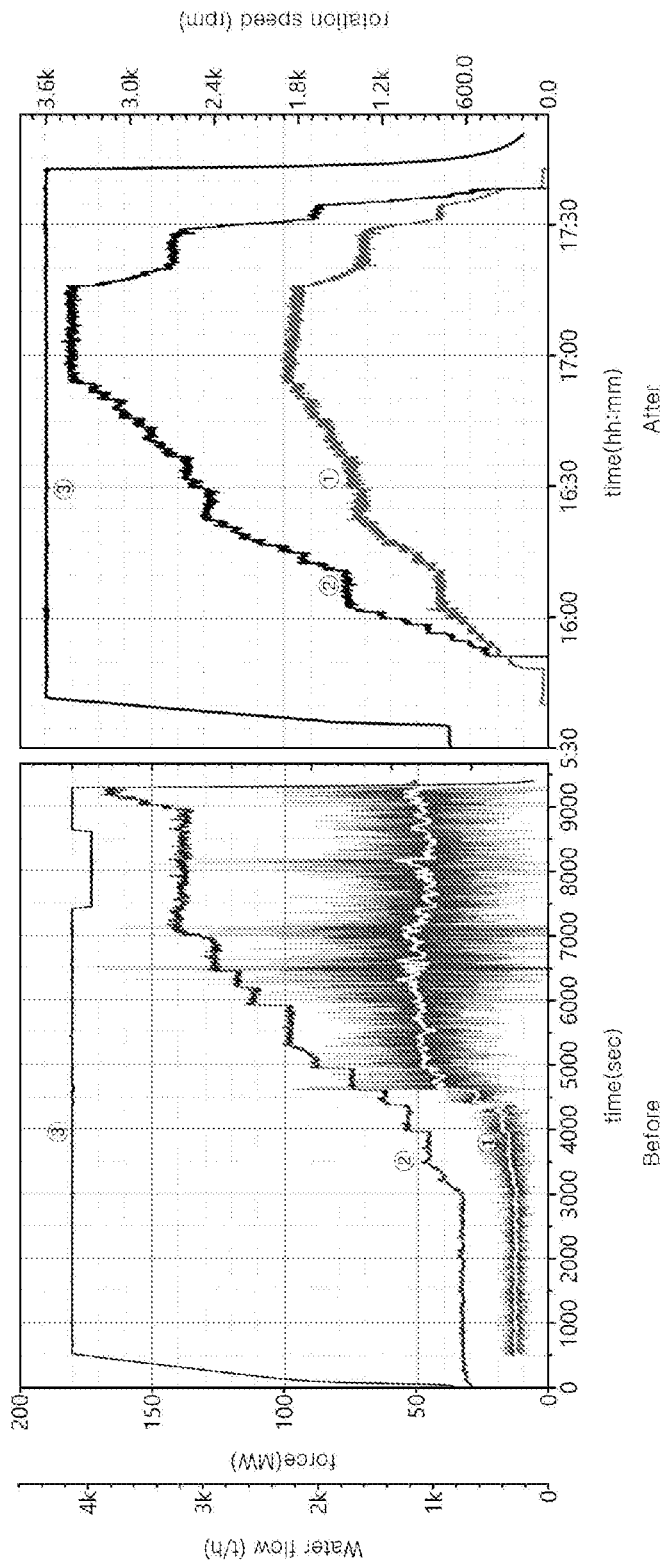
FIG. 13 shows graphs illustrating force, flow rate of water, and rotation speed of a dynamometer, measured before and after installation and operation of the flow adjusting parts according to the present disclosure.

FIG. 13 shows graphs illustrating force, flow rate of water, and rotation speed of a dynamometer, measured before and after installation/operation of the flow adjusting parts according to an embodiment of the present disclosure. As shown in FIG. 13, it can be confirmed that fluctuation during operation of the dynamometers can be sharply reduced upon installation of the flow adjusting parts in the first toroidal chamber 1300*b* and the second toroidal chamber 1300*c*.

Although the present disclosure has been described with reference to the exemplary embodiments illustrated in the drawings, the described embodiments are merely illustrative, so various modifications and equivalents thereof shall be considered within the scope of the disclosure. Therefore, the true technical scope of the present disclosure should be determined by the technical spirit of the appended claims.

The invention claimed is:

1. A dynamometer for measuring load of a rotary shaft to be tested, the dynamometer comprising:
    a dynamometer shaft connected to the rotary shaft to be tested;
    a casing part having a through hole through which the dynamometer shaft passes, being provided in a circumferential surface of the dynamometer shaft, and having a water supply chamber and a drain chamber therein;
    a stator part including a first stator and a second stator provided in the casing part to be spaced apart from each other, both of which provide a space for forming a toroidal chamber on the circumferential surface of the dynamometer shaft, the stator part being formed with a supply nozzle through which fluid of the water supply chamber is supplied into the toroidal chamber;
    a toroidal chamber partitioning part positioned between the first stator and the second stator and partitioning the toroidal chamber into a first toroidal chamber and a second toroidal chamber, both of which are positioned to be spaced apart from each other, wherein the toroidal chamber partitioning part comprises a runner mounted on the circumferential surface of the dynamometer shaft and a guide ring having one end fixed to the casing part and the other end protruding into the toroidal chamber, the runner configured to rotate together upon rotation of the dynamometer shaft, and the guide ring configured to guide fluid in rotation in the first toroidal chamber and the second toroidal chamber to the drain chamber upon rotation of the runner, the guide ring forming a drain slot in between the stator part, through which the fluid is discharged from the first toroidal chamber and the second toroidal chamber to the drain chamber; and
    flow adjusting parts provided in the first toroidal chamber and the second toroidal chamber respectively, adjusting flow rates of the fluid circulating in the first toroidal chamber and the second toroidal chamber.

2. The dynamometer of claim 1, further comprising a control part provided in the casing part, measuring the amount of fluid supplied to the toroidal chamber from the water supply chamber and the amount of fluid discharged from the toroidal chamber to the drain chamber, and thereafter comparing the supplied amount of fluid and the discharged amount of fluid to each other.

3. The dynamometer of claim 1,
    wherein in the center of the first stator, a first through hole through which the dynamometer shaft passes is formed,
    a plurality of first pockets trapezoidal in shape and curved to form a semicircular cross-section, each forming the toroidal chamber, is formed in the first stator, each of the plurality of first pockets being spaced apart from each other in a rotational direction on the basis of the first through hole,
    the first supply nozzle is formed in the first pocket to be adjacent to the first through hole,
    a first air supply port through which air is injected into the first pocket from the outside of the first stator is formed in the first pocket, the first air supply port being spaced apart from the first through hole and communicating with an outer circumferential surface of the first stator,
    a second through hole through which the dynamometer shaft passes is formed in the center of the second stator, a plurality of second pockets trapezoidal in shape and curved to form a semicircular cross-section, each forming the toroidal chamber, is formed in the second stator, each of the plurality of second pockets being spaced apart from each other in a rotational direction on the basis of the second through hole, the second supply nozzle is formed in the second pocket to be adjacent to the second through hole, a second air supply port through which air is injected into the second pocket from the outside of the second stator is formed in the second pocket, the second air supply port being spaced apart from the second through hole and communicating with an outer circumferential surface of the second stator, and fluid sealing members are provided in the first through hole and the second through hole respectively, thereby preventing fluid flowing into the toroidal chamber from leaking through a space between the circumferential surface of the dynamometer shaft and the first thorough hole and the second through hole.

4. The dynamometer of claim 3, wherein the runner comprises a main body having a rectangular cross-section, in the center of which a mount hole is formed for the dynamometer shaft to pass therethrough, and both lateral surfaces of which are spaced apart from the mount hole and are curved in the outer circumference direction to be inserted from the outside to the inside; and a plurality of blades formed to protrude on both lateral surfaces of the main body, wherein the number of the blades is different from the number of the first pockets and the number of the second pockets.

5. The dynamometer of claim 4, wherein the guide ring comprises:

a mount portion mounted on the casing part; and a protruding portion having rectangular cross-section and both lateral surfaces thereof spaced apart from the mount portion, which are curved in the inner circumference direction to be inserted from the outside to the inside, wherein a communication hole is formed on the mount portion for the fluid in the drain chamber to pass therethrough, and longitudinal lengths of the first pockets and the second pockets are between twice and three times the length of each of the blades.

6. The dynamometer of claim 1, wherein the flow adjusting parts are mounted on the first stator and the second stator respectively to be adjacent to the drain slot in the first toroidal chamber and the second toroidal chamber, and a control slot is formed in each of the flow adjusting parts, the control slot being configured to circulate a part of the fluid flowing to be rotated in the first toroidal chamber and the second toroidal chamber to the supply nozzle.

7. The dynamometer of claim 6, wherein the control slot is disposed adjacently to the drain slot formed on circumferential sides of the first toroidal chamber and the second toroidal chamber, the control slot is formed in each of the flow adjusting parts to have a rectangular shape, and corners of the control slot are entirely or partially curved.

8. The dynamometer of claim 6, wherein the control slot is formed in each of the flow adjusting parts in a manner that a plurality of slot holes having a circular shape are spaced apart from each other in one tier or multiple tiers.

9. A dynamometer for measuring load of a rotary shaft to be tested, the dynamometer comprising:

a dynamometer shaft connected to the rotary shaft to be tested;

a casing part having a through hole through which the dynamometer shaft passes, being provided in a circumferential surface of the dynamometer shaft, and having a water supply chamber and a drain chamber therein;

a stator part including a first stator and a second stator provided in the casing part to be spaced apart from each other, both of which provide a space for forming a toroidal chamber on the circumferential surface of the dynamometer shaft, the stator part being formed with a supply nozzle through which fluid of the water supply chamber is supplied into the toroidal chamber;

a toroidal chamber partitioning part positioned between the first stator and the second stator and partitioning the toroidal chamber into a first toroidal chamber and a second toroidal chamber, both of which are positioned to be spaced apart from each other, and forming a drain slot in between the stator part, through which the fluid is discharged from the first toroidal chamber and the second toroidal chamber to the drain chamber, wherein the toroidal chamber partitioning part is mounted on the circumferential surface of the dynamometer shaft, configured to rotate together upon rotation of the dynamometer shaft, thereby guiding the fluid in rotation in the first toroidal chamber and the second toroidal chamber to the drain slot; and flow adjusting parts provided in the first toroidal chamber and the second toroidal chamber respectively, adjusting flow rates of the fluid circulating in the first toroidal chamber and the second toroidal chamber.

10. The dynamometer of claim 9, further comprising a control part provided in the casing part, measuring the amount of fluid supplied to the toroidal chamber from the water supply chamber and the amount of fluid discharged from the toroidal chamber to the drain chamber, and thereafter comparing the supplied amount of fluid and the discharged amount of fluid to each other.

11. The dynamometer of claim 10, wherein in the center of the first stator, a first through hole through which the dynamometer shaft passes is formed, a plurality of first pockets trapezoidal in shape and curved to form a semicircular cross-section, each forming the toroidal chamber, is formed in the first stator, each of the plurality of first pockets being spaced apart from each other in a rotational direction on the basis of the first through hole, the first supply nozzle is formed in the first pocket to be adjacent to the first through hole, a first air supply port through which air is injected into the first pocket from the outside of the first stator is formed in the first pocket, the first air supply port being spaced apart from the first through hole and communicating with an outer circumferential surface of the first stator, a second through hole, a plurality of second pockets, a second supply nozzle, and a second air supply port are formed in the second stator, and the second stator corresponds in shape to the first stator.

12. The dynamometer of claim 11, wherein the toroidal chamber partitioning part comprises:

a mount portion formed in the center thereof in a manner that a mount hole for the circumferential surface of the dynamometer shaft passes therethrough; and a guide portion protruding to the outside of the mount portion, forming a drain slot in the first toroidal chamber and the second toroidal chamber so as to guide fluid in rotation in the first toroidal chamber and the second toroidal chamber to the drain slot, wherein the mount portion and the guide portion are integrally formed, both lateral surfaces of the mount portion and the guide portion have a cross-sectional shape curved in a semicircular shape to be inserted from the outside to the inside, a plurality of blades are formed to protrude on both lateral surfaces of the mount portion, the number of the blades is different from the number of the first pockets and the number of the second pockets, and the longitudinal lengths of the first pocket and the second pocket are between twice and three times the length of each of the blades.

13. The dynamometer of claim 9, wherein the flow adjusting parts are mounted on the first stator and the second stator respectively to be adjacent to the drain slot in the first toroidal chamber and the second toroidal chamber, and a control slot is formed in each of the flow adjusting parts, the control slot being configured to circulate a part of the fluid flowing to be rotated in the first toroidal chamber and the second toroidal chamber to the supply nozzle, the control slot is arranged adjacently to the drain slot formed on circumferential sides of the first toroidal chamber and the second toroidal chamber, the control slot is formed in each of the flow adjusting parts to have a rectangular shape, and corners of the control slot are formed to be curved entirely or partially.

14. The dynamometer of claim 13, wherein the control slot is formed in each of the flow adjusting parts in a manner that a plurality of slot holes having a round shape are spaced apart from each other in one tier or multiple tiers.

15. A dynamometer for measuring a load of a rotary shaft to be tested, the dynamometer comprising:
a dynamometer shaft connected to the rotary shaft to be tested;
a casing part having a through hole through which the dynamometer shaft passes, being provided in a circumferential surface of the dynamometer shaft, and having a water supply chamber and a drain chamber therein;
a stator part including a first stator and a second stator provided in the casing part to be spaced apart from each other, both of which provide a space for forming a toroidal chamber on the circumferential surface of the dynamometer shaft, the stator part being formed with a supply nozzle through which fluid of the water supply chamber is supplied into the toroidal chamber;
a toroidal chamber partitioning part positioned between the first stator and the second stator and partitioning the toroidal chamber into a first toroidal chamber and a second toroidal chamber so as to be spaced apart from each other, wherein the toroidal chamber partitioning part is mounted on the circumferential surface of the dynamometer shaft and guides the fluid in rotation in the first toroidal chamber and the second toroidal chamber to the drain slot while rotating jointly upon rotation of the dynamometer shaft; and
flow adjusting parts provided in the first toroidal chamber and the second toroidal chamber respectively, adjusting flow rates of the fluid circulating in the first toroidal chamber and the second toroidal chamber.

16. The dynamometer of claim 15, further comprising a control part provided in the casing part, measuring the amount of fluid supplied into the toroidal chamber from the water supply chamber and the amount of fluid discharged to the drain chamber from the toroidal chamber and thereafter comparing the supplied amount of the fluid and the discharged amount of the fluid to each other.

17. The dynamometer of claim 15,
wherein in the center of the first stator, a first through hole through which the dynamometer shaft passes is formed,
a plurality of first pockets trapezoidal in shape and curved to form a semicircular cross-section, each forming the toroidal chamber, is formed in the first stator, each of the plurality of first pockets being spaced apart from each other in a rotational direction on the basis of the first through hole,
the first supply nozzle is formed in the first pocket to be adjacent to the first through hole,
a first air supply port through which air is injected into the first pocket from the outside of the first stator is formed in the first pocket, the first air supply port being spaced apart from the first through hole and communicating with an outer circumferential surface of the first stator,
a second through hole, a plurality of second pockets, a second supply nozzle, and a second air supply port are formed in the second stator, and
the second stator corresponds in shape to the first stator.

18. The dynamometer of claim 17, wherein the toroidal chamber partitioning part has a rectangular shape, in which a mount hole for the circumferential surface of the dynamometer shaft is formed in the center thereof to pass therethrough, and a protruding portion formed on an outer circumferential surface thereof, so as to protrude to be inclined curvedly from the outside to the inside, thereby guiding the fluid being rotated in the first toroidal chamber and the second toroidal chamber to the drain chamber,
wherein a tip end of the protruding portion protrudes from the outer circumferential surface of the toroidal chamber partitioning part so that the protruding portion is adjacent to each of the flow adjusting parts in the first toroidal chamber and the second toroidal chamber,
a plurality of blades are formed on both lateral surfaces of the mount portion to protrude,
the number of the blades is different from the number of the first pockets and the number of the second pockets, and
the longitudinal lengths of the first pocket and the second pocket are between twice or three times the length of each of the blades.

19. The dynamometer of claim 15, wherein the flow adjusting parts are mounted on the first stator and the second stator respectively to be adjacent to the drain slot in the first toroidal chamber and the second toroidal chamber, and
a control slot is formed in each of the flow adjusting parts, the control slot being configured to circulate a part of the fluid flowing to be rotated in the first toroidal chamber and the second toroidal chamber to the supply nozzle,
the control slot is arranged adjacently to the drain slot formed on circumferential sides of the first toroidal chamber and the second toroidal chamber,
the control slot is formed in each of the flow adjusting parts to have a rectangular shape, and
corners of the control slot are formed to be curved entirely or partially.

20. The dynamometer of claim 19, wherein the control slot is formed in each of the flow adjusting parts in a manner that a plurality of slot holes having a round shape are spaced apart from each other in one tier or multiple tiers.

\* \* \* \* \*